(12) United States Patent
Nieberle

(10) Patent No.: US 9,719,666 B2
(45) Date of Patent: Aug. 1, 2017

(54) LUMINOUS ELEMENT HOLDER, CONNECTION PIECE AND SYSTEM INCLUDING A LUMINOUS ELEMENT HOLDER AND A CONNECTION PIECE

(75) Inventor: Ludwig Nieberle, Kaldorf (DE)

(73) Assignee: OSRAM GMBH, Munich (DE)

( * ) Notice: Subject to any disclaimer, the term of this patent is extended or adjusted under 35 U.S.C. 154(b) by 45 days.

(21) Appl. No.: 13/989,816

(22) PCT Filed: Nov. 10, 2011

(86) PCT No.: PCT/EP2011/069834
§ 371 (c)(1),
(2), (4) Date: May 28, 2013

(87) PCT Pub. No.: WO2012/072397
PCT Pub. Date: Jun. 7, 2012

(65) Prior Publication Data
US 2013/0265784 A1    Oct. 10, 2013

(30) Foreign Application Priority Data
Nov. 30, 2010 (DE) .......... 10 2010 062 185

(51) Int. Cl.
*F21V 19/00* (2006.01)
*F21V 21/00* (2006.01)
*F21S 8/00* (2006.01)
*F21V 8/00* (2006.01)
*G09F 13/18* (2006.01)
(Continued)

(52) U.S. Cl.
CPC ............... *F21V 21/00* (2013.01); *F21S 8/00* (2013.01); *G02B 6/009* (2013.01); *G02B 6/0068* (2013.01); *G02B 6/0073* (2013.01); *G02B 6/0091* (2013.01); *G09F 13/18* (2013.01);
(Continued)

(58) Field of Classification Search
CPC . F21S 8/00; F21V 21/00; H01R 33/02; G02B 6/0068; G02B 6/0073; G02B 6/009; G02B 6/0091
USPC ..... 362/382, 630, 632, 634, 217.13, 217.17, 362/457, 217.1, 217.11–217.12,
(Continued)

(56) References Cited

U.S. PATENT DOCUMENTS 5,107,408 A    4/1992 Vernondier
6,305,109 B1 * 10/2001 Lee ................................. 40/546
(Continued)

FOREIGN PATENT DOCUMENTS

CN    101680991 A    3/2010
DE    7324308 U      9/1973
(Continued)

OTHER PUBLICATIONS

English abstract of EP 2101309 A1 dated Sep. 16, 2009.
(Continued)

*Primary Examiner* — Evan Dzierzynski
(74) *Attorney, Agent, or Firm* — Viering, Jentschura & Partner mbB

(57) ABSTRACT

A luminous element holder for fastening to at least one body, includes a slot-like interior chamber, wherein, by means of at least one web protruding laterally into the interior chamber, the interior chamber is divided into a slot-like insertion chamber for receiving the at least one body and a receiving chamber, openly adjoining the insertion chamber, for at least one luminous element.

7 Claims, 9 Drawing Sheets

(51) Int. Cl.
    *G09F 13/22* (2006.01)
    *H01R 33/02* (2006.01)
(52) U.S. Cl.
    CPC ............. *G09F 13/22* (2013.01); *H01R 33/02* (2013.01); *G09F 2013/222* (2013.01)
(58) Field of Classification Search
    USPC ......... 362/217.14–217.16, 217.01, 219, 221; 439/733.1
    See application file for complete search history.

(56) References Cited

U.S. PATENT DOCUMENTS

| | | | | |
|---|---|---|---|---|
| 6,481,130 | B1* | 11/2002 | Wu | 40/546 |
| 7,380,957 | B2* | 6/2008 | Lanczy | 362/219 |
| 8,104,920 | B2* | 1/2012 | Dubord | F21S 2/005 362/217.12 |
| 8,304,993 | B2* | 11/2012 | Tzou et al. | 315/51 |
| 8,511,879 | B2 | 8/2013 | Im | |
| 2008/0285274 | A1* | 11/2008 | Jung | 362/240 |
| 2008/0314944 | A1 | 12/2008 | Tsai et al. | |
| 2010/0232152 | A1* | 9/2010 | Bankemper et al. | 362/219 |
| 2012/0106129 | A1* | 5/2012 | Glovatsky et al. | 362/92 |
| 2012/0262916 | A1* | 10/2012 | Gadda et al. | 362/235 |

FOREIGN PATENT DOCUMENTS

| | | |
|---|---|---|
| DE | 20004879 U1 | 7/2000 |
| DE | 10252642 A1 | 5/2004 |
| DE | 202008001105 U1 | 8/2008 |
| EP | 2101309 A1 | 9/2009 |
| WO | 2009157686 A2 | 12/2009 |
| WO | 2010095156 A1 | 12/2009 |

OTHER PUBLICATIONS

English abstract of DE 10252642 A1 dated May 27, 2004.
English abstract of WO 2009157686 A2 dated Dec. 30, 2009.
Office Action issued for parallel CN application No. 201180057618.6 on Sep. 26, 2014.

* cited by examiner

US 9,719,666 B2

LUMINOUS ELEMENT HOLDER, CONNECTION PIECE AND SYSTEM INCLUDING A LUMINOUS ELEMENT HOLDER AND A CONNECTION PIECE

RELATED APPLICATIONS

The present application is a national stage entry according to 35 U.S.C. §371 of PCT application No.: PCT/EP2011/069834 filed on Nov. 10, 2011, which claims priority from German application No.: 10 2010 062 185.4 filed on Nov. 30, 2010.

TECHNICAL FIELD

Various embodiments relate to a luminous element holder for fastening to a body. Various embodiments relate furthermore to a connection piece for fastening to the luminous element holder. Various embodiments also relate to a system including at least one luminous element holder and at least one connection piece.

BACKGROUND

There has not so far been any standardized solution for the connection of a light-emitting diode (LED) module to an acrylic glass sheet for achieving the effect of coupling a light radiated by the LED module into an edge of the acrylic glass sheet (edge coupling). With existing means, an exact distance between the LEDs of the LED module and the edge of the acrylic glass that is required for high coupling efficiency can only be ensured with great effort.

The LEDs may also be destroyed if there is direct mechanical contact of the LEDs of the LED module with the acrylic glass sheet. In order to avoid this it is known for spacers to be adhesively attached to the LED module, although this can in turn cause interconnects of the LED module to be damaged.

Moreover, for securing the acrylic glass sheets, they are typically drilled through, as a result of which illumination efficiency is significantly reduced.

In addition, for electrical contacting, cables have to be led to each LED module, which significantly restricts any extension and modification of a structure.

SUMMARY

Various embodiments provide improved coupling, in particular edge coupling, of light into a body.

Various embodiments provide a luminous element holder for fastening to at least one body, having a slot-like interior chamber, wherein, by means of at least one web or projection protruding laterally into the interior chamber, the interior chamber is divided into a slot-like insertion chamber for receiving the at least one body and a receiving chamber, openly adjoining the insertion chamber, for at least one luminous element.

A body can therefore be inserted, pushed or otherwise introduced into the insertion chamber, or the luminous element holder can be fitted and so on onto the body. The insertion chamber and the receiving chamber are openly connected to one another.

A defined support or stop for the body introduced is provided by the at least one web, so that a distance of the body with respect to the receiving chamber, and consequently with respect to a luminous element that can be accommodated in the receiving chamber, can be advantageously set definitely and precisely. The luminous element need not touch the body, and the luminous element is mechanically relieved. The body also does not have to be drilled into, or worked in any other way, in order to be connected to the luminous element holder, so that particularly effective light coupling and easy assembly are obtained. The body may for example be held in the insertion chamber by a force closure (for example by means of a clamping fit or a punctiform screw contact), a form fit (for example by means of an arrangement of luminous element holders running around in the manner of a frame) and/or a material bond (for example with the aid of an adhesive).

The luminous element holder may in particular be configured in the form of a profile, in particular elongated with substantially the same basic form along the length.

The slot-like interior chamber may in particular be open on three sides, to be specific open on one, in particular narrow, longitudinal side and at its two longitudinal ends or end faces. The slot-like interior chamber may then be delimited in particular by two substantially parallel-running side walls and the webs.

The body may in particular be a plate-like or sheet-like body.

The body may in particular be a transparent or translucent body, for example an acrylic glass sheet.

There is a configuration where the luminous element holder is of a substantially U-shaped form (in profile). The webs may in this case protrude in particular perpendicularly inward from the two legs of the "U". This configuration can be produced particularly easily and is of low weight. The legs of the "U" in this case represent the side walls of the luminous element holder, the cross-piece represents a base of the receiving chamber.

There is another configuration where the luminous element holder, or at least one side wall thereof, has at least one through-hole at least on one side in a region of its longitudinal ends that is laterally level with the receiving chamber. The at least one through-hole makes it possible for the luminous element holder to be connected easily (for example in a way that can be carried out by service personnel), and possibly also releasably, with connection pieces attached at the ends, for example as described more precisely further below.

There is an advantageous development for fastening that is particularly secure and flexible with respect to alignment where the luminous element holder has at least one through-hole respectively on both sides in a region of its longitudinal ends that is laterally level with the receiving chamber, the through-holes of opposite sides being located in particular at the same height.

For being easily provided with screws or the like, the through-hole may in particular be formed as a threaded hole. Alternatively, the through-hole may not have a thread, and thus be suitable for the insertion of a pin, possibly a self-locking pin, or a screw with a tapping thread, etc.

There is also a configuration where the luminous element holder, or at least one side wall thereof, has at least one threaded hole level with the insertion chamber. Screws, in particular threaded pins, for the substantially punctiform fixing of the body to the luminous element holder can be inserted through this threaded hole. A secure connection is obtained with only little coupling out of light in a contact region between the respective screw and the body. This coupling out of light is much less than in the case of a clamping connection of the luminous element holder or in the case of adhesive bonding. The body does not need to be prepared for this, for example drilled into. The spacing and number of the threaded holes can in principle be chosen freely.

There is another configuration where at least one luminous element in the form of a semiconductor light strip is accommodated in the receiving chamber, the semiconductor light strip respectively having at its ends an electrical connection element, which can be contacted through the longitudinal ends of the luminous element holder. This makes easy electrical contacting possible, for example by laterally fitting on a connection (counter) element of a matching configuration. The connection (counter) element may in particular be part of a connection piece. Quite generally, the at least one luminous element is not restricted.

For reasons including the achievement of a long service life, a color change that can be easily carried out and/or dimming that can be finely graduated, there is a development where the at least one luminous element includes at least one luminous semiconductor element. The luminous semiconductor element may in turn have one or more semiconductor light sources. Preferably, the at least one semiconductor light source includes at least one light-emitting diode. If there are a number of light-emitting diodes, they may emit light of the same color or of different colors. A color may be monochromatic (for example red, green, blue, etc.) or multichromatic (for example white). The light emitted by the at least one light-emitting diode may also be an infrared light (IR-LED) or an ultraviolet light (UV-LED). Multiple light-emitting diodes may produce a mixed light; for example a white mixed light. The at least one light-emitting diode may contain at least one wavelength-converting luminescent material (conversion LED). The at least one light-emitting diode may be in the form of at least a single packaged light-emitting diode or in the form of at least one LED chip. Multiple LED chips may be mounted on a common substrate ("submount"). The at least one light-emitting diode may be equipped with at least one optical system of its own and/or a shared optical system for beam guidance, for example at least one Fresnel lens, collimator, and so on. Instead of or in addition to inorganic light-emitting diodes, for example on the basis of InGaN or AlInGaP, organic LEDs (OLEDs, for example polymer OLEDs) can generally also be used. Alternatively, the at least one semiconductor light source may for example have at least one diode laser.

For easy mounting and uniform arrangement of the individual semiconductor light sources, the luminous semiconductor element may be a semiconductor light strip. The semiconductor light strip may in particular have a strip-like (rigid or flexible) substrate, for example a printed circuit board, on which multiple semiconductor light sources are arranged, in particular in a row, in particular with a substantially regular spacing.

The light emitted by the at least one luminous element can radiate through the opening between the receiving chamber and the insertion chamber, and consequently onto a body inserted into the insertion chamber. The distance and the position of the at least one luminous element from and in relation to the body can be set with great accuracy. To increase a degree of light utilization, the receiving chamber may be mirror-coated. To achieve a particularly high degree of light utilization, light sources, for example light-emitting diodes, that are directed (not radiating into space with a homogeneous light intensity) may be aligned with their optical axis or principal radiating direction particularly in the direction of the opening.

There is also a configuration where the at least one luminous element is accommodated in the receiving chamber such that a predominant component of a light that can be radiated by it falls directly through an opening between the receiving chamber and the insertion region.

Various embodiment also provide a connection piece for fastening to the luminous element holder, in particular as described above, wherein (a) on at least one terminal connection side, the connection piece can be mounted onto an end of the luminous element holder, (b) the connection piece has on each connection side two spaced-apart insertion projections, the insertion projections respectively having at least one through-hole, in particular a threaded hole, and (c) the connection piece has between the insertion projections an electrical connection element.

The respectively two spaced-apart insertion projections may serve firstly for easy positioning on the luminous element holder and secondly for fastening to the luminous element holder. For positioning, the insertion projections may in particular be set up and arranged for being inserted into an open lateral end of the receiving chamber of the luminous element holder, to be precise preferably tightly (without any play or with only little play), in order to achieve exact relative positioning. The through-holes may be used for fastening to the luminous element holder, by said holes being brought into line with the matching through-holes of the luminous element holder and fixed one against the other by a common fastening element (screw, pin, etc.). The electrical connection element makes it possible for the at least one luminous element that is located in the receiving chamber of the luminous element holder to be electrically contacted easily, in particular by a plugging movement. The electrical connection element of the connection piece and a matching electrical connection element of the luminous element may in particular form an electrical plug-in connection, the connection elements consequently forming a connection element and a connection (counter) element. The electrical plug-in connection is particularly easy in terms of its assembly and use.

There is a development where the connection piece has a slot-like insertion chamber for receiving the plate-like body. The slot-like insertion chamber advantageously allows the formation of an insertion chamber that is shared with the luminous element holder, one adjoining the other, and thus even relatively large bodies can be effectively illuminated from the side.

There is a configuration where the connection piece has just one connection side and has on an end face opposite from the connection side, or a terminating side, a lead-through to the electrical connection element. This connection piece may in particular be used as a terminating piece or end piece, in particular for providing an external supply connection.

There is also a configuration where the connection piece is an (intermediate) connector, which has at least two connection sides. This makes it possible for multiple luminous element holders to be electrically and mechanically connected to the body. The luminous elements of the various luminous element holders may in particular be electrically connected in series.

There is also a configuration where the connector is a linear intermediate connector, the connection sides of which are arranged facing away from one another and linearly in relation to one another. This makes it possible for multiple luminous element holders to be electrically and mechanically connected in a straight line, in particular on one side of the at least one body.

There is also a configuration where the connector is a corner connector, the connection sides of which are arranged facing away from one another and at right angles in relation to one another. This makes edge illumination of the body on multiple sides possible in a way that is particularly easy to establish.

Various embodiments provide a system including at least one luminous element holder as described above, the luminous element holder particularly being of a substantially U-shaped form, and at least one connection piece as described above, the at least one connection piece being inserted with at least one connection side onto an end of a luminous element holder such that the insertion projections are pushed tightly into the receiving chamber and the through-holes of the insertion projections and the through-holes of the luminous element holder thereby coincide and are fixed by a common fastening element. This provides the advantages that have already been referred to.

There is a configuration where the body is inserted in the respective insertion chambers. The system may in particular have the form of a frame which surrounds the body on at least three sides, in particular in an at least substantially enclosing manner.

The system, in particular plug-in system, may be extended both mechanically and electrically as desired and may at the same time also assume various forms.

The luminous element holder(s) and the connection pieces may in particular be produced from aluminum. The use of aluminum provides the advantage of low weight and good thermal conductivity, and consequently heat dissipation from the at least one luminous element.

The luminous element holder(s) and the connection pieces may be attached to the body on one or more sides.

The luminous element holder(s) and the connection pieces may also serve as heat sinks for the at least one luminous element.

BRIEF DESCRIPTION OF THE DRAWINGS

In the following figures, the invention is schematically described more precisely on the basis of an exemplary embodiment. For the sake of clarity, elements that are the same or act in the same way may be provided with the same designations.

DETAILED DESCRIPTION

The following detailed description refers to the accompanying drawings that show, by way of illustration, specific details and embodiments in which the invention may be practiced.

Figure 1:
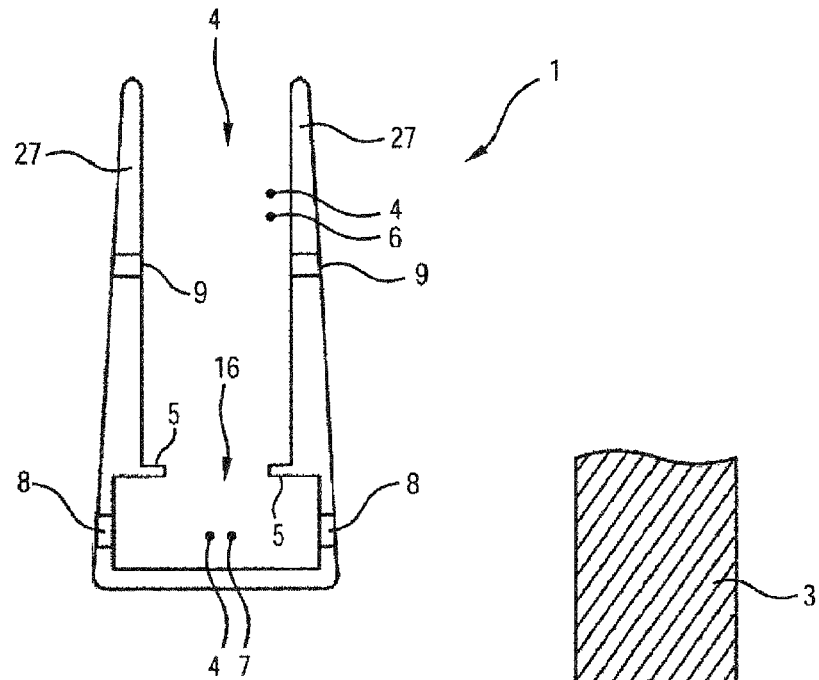
FIG. 1 shows a luminous element holder according to the disclosed embodiment in profile.
Figure 2:
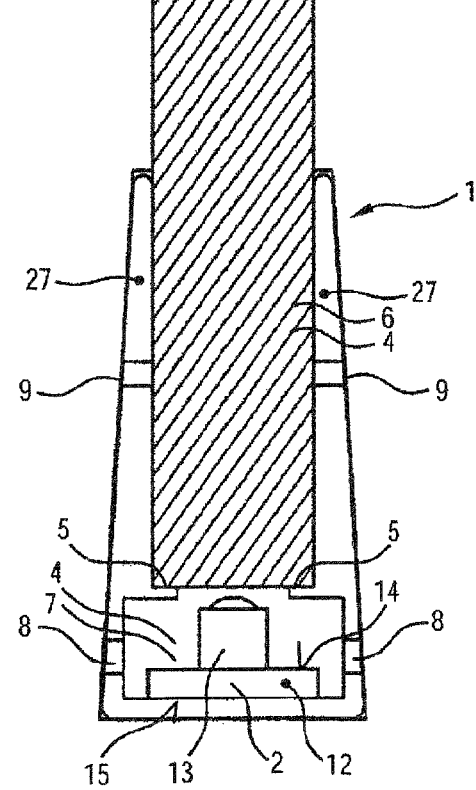
FIG. 2 shows the luminous element holder according to the disclosed embodiment in profile, with a luminous element accommodated therein and a body fastened thereto.
Figure 3:
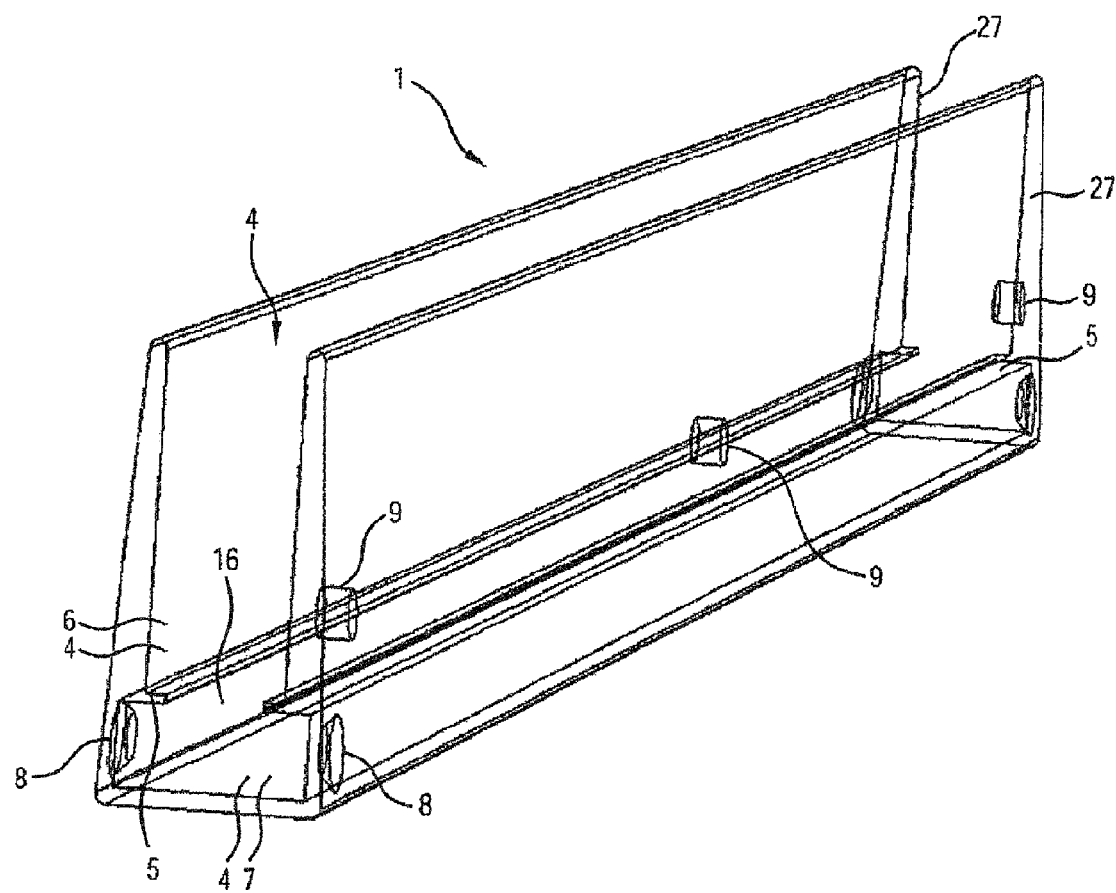
FIG. 3 shows the luminous element holder according to the disclosed embodiment in an oblique view as a wire drawing.
Figure 4:
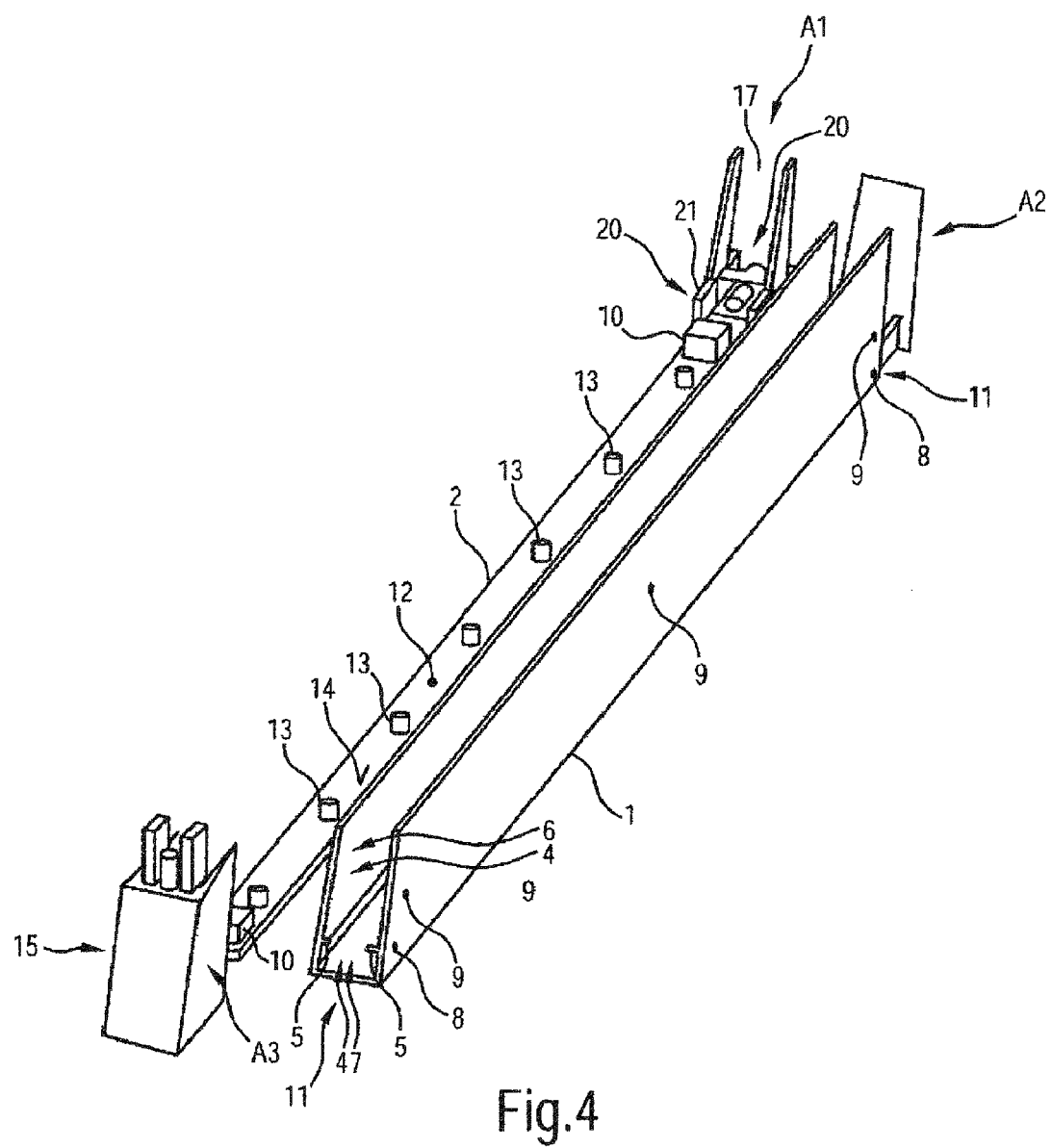
FIG. 4 shows the luminous element holder according to the disclosed embodiment in an oblique view, with the luminous element and three connection pieces according to the disclosed embodiment as provided by a first, a second and a third embodiment.

FIG. 1 shows a luminous element holder 1 in profile, for fastening to a body. FIG. 2 shows the luminous element holder 1 in profile, with a luminous element accommodated therein in the form of an LED light strip 2 and the body fastened thereto in the form of an acrylic glass sheet 3. FIG. 3 shows the luminous element holder 1 in an oblique view as a wire drawing. FIG. 4 shows the luminous element holder 1 in an oblique view, with the LED light strip 2 and three connection pieces according the invention as provided by a first, a second and a third embodiment, to be specific an intermediate connector A1, a terminating piece A2 and a corner connector A3.

The luminous element holder 1 is in the form of a U-shaped profile. The luminous element holder 1 has a slot-like interior chamber 4. By means of at least one web 5 protruding laterally from an associated side wall 27 into the interior chamber 4, the interior chamber 4 is divided on both sides into an insertion chamber 6 that is open on one side, for receiving the acrylic glass sheet 3, and a receiving chamber 7 that openly adjoins the insertion chamber 6, for receiving the LED light strip 2. The side walls 27 correspond to the legs of the "U".

The luminous element holder 1 has a through-hole 8 in the form of a threaded hole on both sides or in each of the side walls in a region of its two longitudinal ends 11 (but at a distance from the respective end 11), in each case laterally level with the receiving chamber 7. The through-holes 8 lie at the same height.

The luminous element holder 1 also has on one side, or in one of the side walls 27, threaded holes 9, here by way of example three, which are level with the insertion chamber 6 and through which a screw, for example a threaded pin, may be screwed, in order to fix the acrylic glass sheet 3.

As shown in FIG. 2, the LED light strip 2 is accommodated in the receiving chamber 7, the semiconductor light strip 2 respectively having at its longitudinal ends an electrical connection element 10, which may be contacted through the ends 11 of the luminous element holder 1. The LED light strip 2 generally has a straight strip-like, possibly flexible, printed circuit board 12, the upper side 14 of which is provided with the connection elements 10 and multiple light-emitting diodes 13 arranged equidistantly therebetween in series.

In this case, the LED light strip 2 is attached with its rear side 15 to a base of the receiving chamber 7 (the cross portion of the "U"), and consequently is accommodated in the receiving chamber 7 such that a predominant component of a light that can be radiated by the LED light strip 2 falls directly through a slot-like opening 16 between the receiving chamber 7 and the insertion region 6. The light-emitting diodes 13 are in this case directed with their optical axis or principal radiating direction straight at the opening 16.

As can be seen in particular from FIG. 2, a stop for the acrylic glass sheet 3, which precisely sets a distance from the light-emitting diodes 13, may be created by the webs 5. The light-emitting diodes 13 mainly emit light directly into the acrylic glass sheet 3, so that a very good lighting effect is obtained. For further improvement of a coupling of light into the acrylic glass sheet 3, the receiving chamber 7 may be mirror-coated.

Apart from the luminous element holder 1 and the LED light strip 2, FIG. 4 also shows three connection pieces that can be coupled with an end 11 of the luminous element holder 1, in particular can be inserted there, first, second and third connection pieces A1, A2 and A3.

Figure 5:
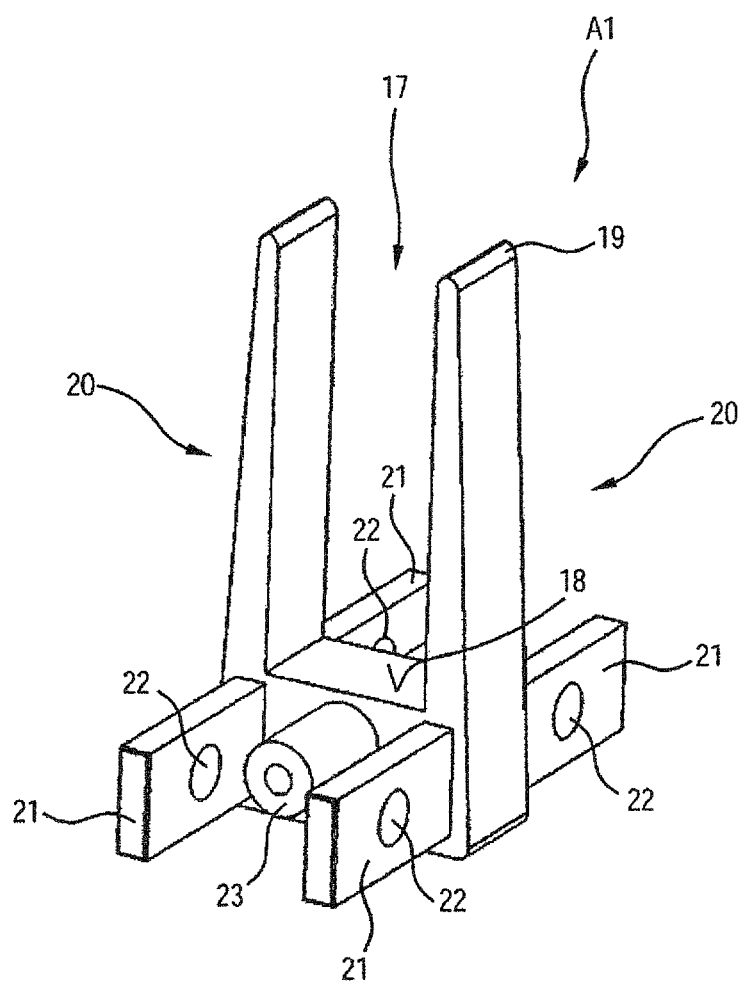
FIG. 5 shows the connection piece according to the disclosed embodiment as provided by the first embodiment in an oblique view.
Figure 6:
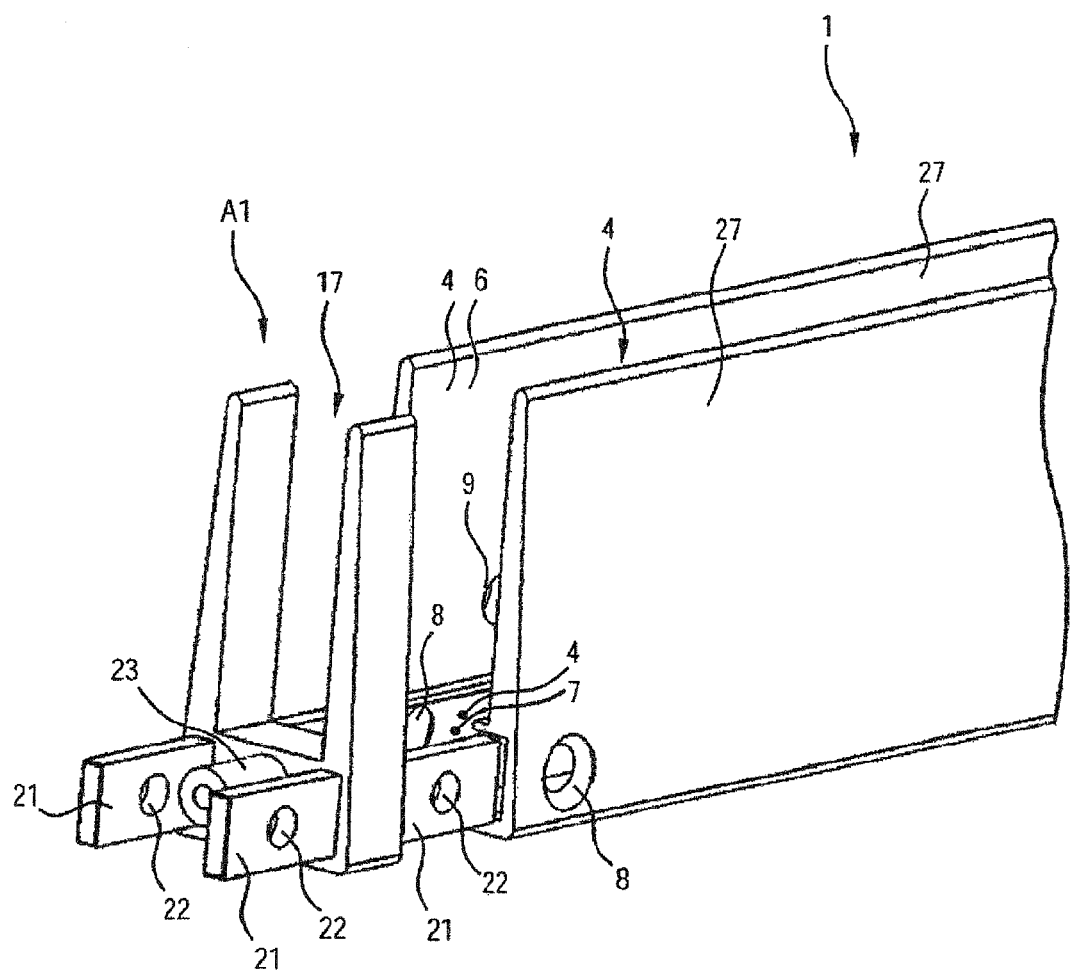
FIG. 6 shows the connection piece according to the disclosed embodiment as provided by the first embodiment in an oblique view mounted on the luminous element holder according to the invention shown in the form of a detail, for insertion in a longitudinal end of the same.
Figure 7:
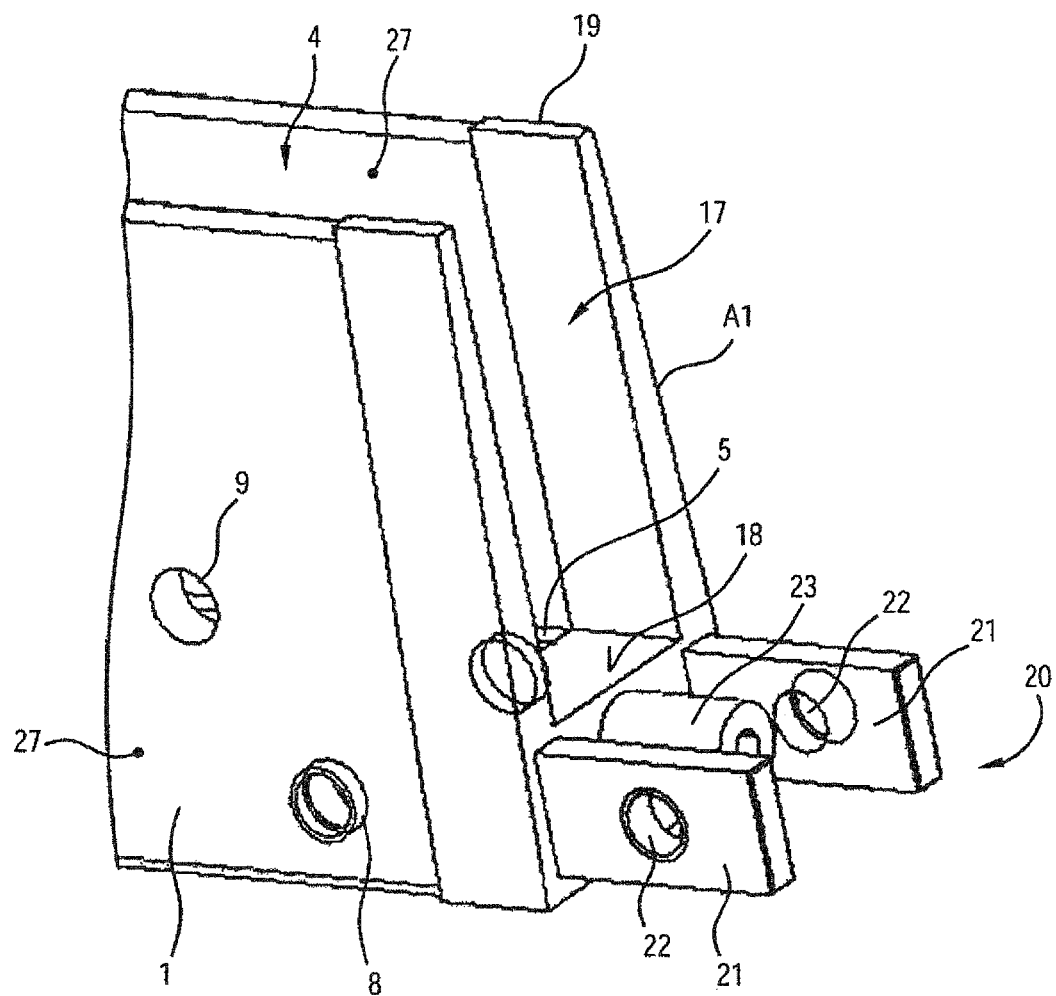
FIG. 7 shows a detail taken from the luminous element holder according to the disclosed embodiment in an oblique view, in a region of a longitudinal end with the connection piece according to the invention as provided by the first embodiment inserted therein.

As shown in FIG. 5, FIG. 6 and FIG. 7, the first connection piece is formed as an intermediate connector A1, in order to connect two luminous element holders 1 linearly to one another mechanically and electrically.

The intermediate connector A1 has a slot-like insertion chamber 17, the base 18 of which lies approximately level in height with the webs 5 of the neighboring luminous element holder 1, and the upper edges 19 of which finish approximately level in height with the luminous element holder 1.

The intermediate connector A1 has two terminal connection sides 20 facing away from one another, which can respectively be mounted on an end 11 of a respective luminous element holder 1. In a state in which it is mounted on one side, as shown, a practically combined insertion chamber for receiving the acrylic glass plate 3 or some other suitable body can be formed by the insertion chambers 6, 17.

Each of the identically designed connection sides 20 has two spaced-apart insertion projections 21 extending in a longitudinal direction or projecting horizontally, the insertion projections 21 respectively having at least one through-hole in the form of a threaded hole 22. The intermediate connector A1 also has between the insertion projections 21 an electrical connection element 23, aligned in the same direction, for example a plug or a socket. The connection elements 23 of the two connection sides 20 are electrically led through, and thus connected to one another.

The intermediate connector A1 has been inserted here with a connection side 20 into the end 11 of the luminous element holder 1 such that the insertion projections 21 have been pushed tightly into the receiving chamber 7, and the threaded holes 22 of the insertion projections 21 and the through-holes 8 of the luminous element holder 1 thereby coincide and may be fixed to one another by a common fastening element, for example a screw.

This allows the intermediate connector A1 to be mechanically connected to the luminous element holder 1 securely and precisely.

For the electrical contacting, the electrical connection element 23 has then been fitted onto the matching connection element 10 of the LED light strip 2.

Figures 8, 9:
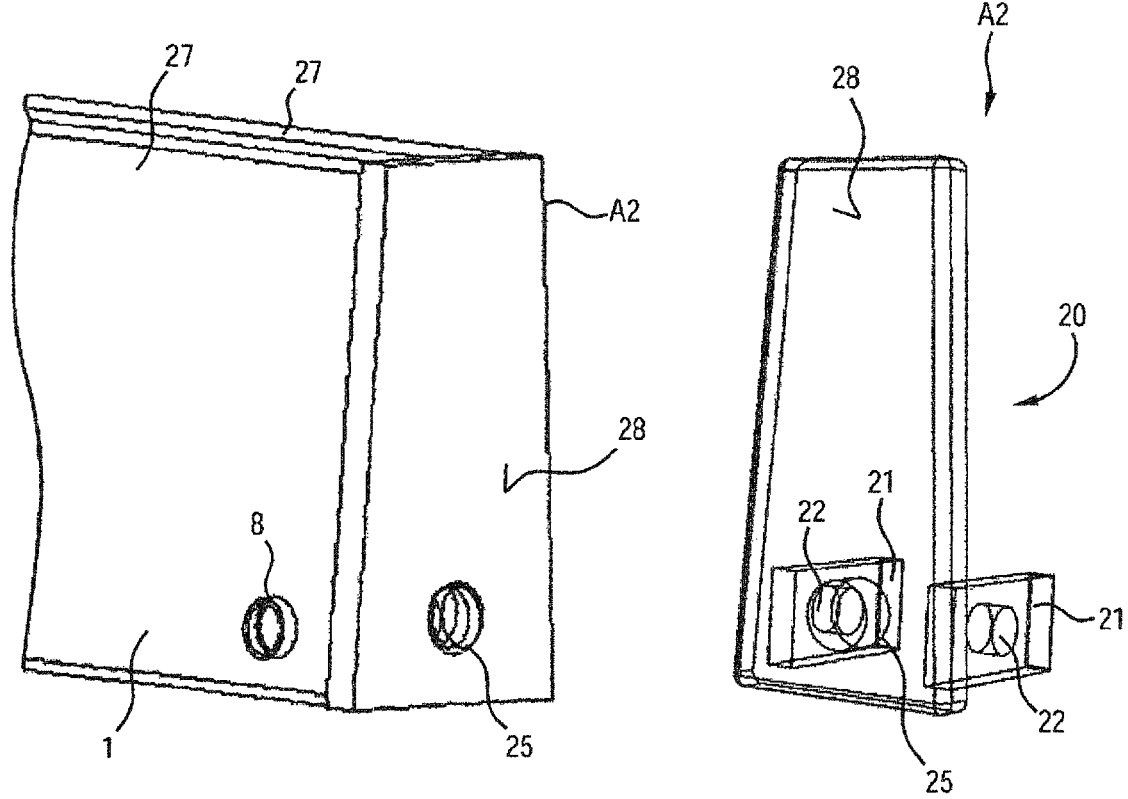
FIG. 8 shows a detail taken from the luminous element holder according to the disclosed embodiment in an oblique view, in a region of one of its longitudinal ends with the connection piece according to the disclosed embodiment as provided by the second embodiment.
FIG. 9 shows the connection piece according to the disclosed embodiment as provided by the second embodiment in an oblique view as a wire drawing.

FIG. 8 shows the terminating piece A2 more precisely, in a state in which it has been inserted into a luminous element holder 1. FIG. 9 shows the terminating piece A2 in an oblique view as a wire drawing. The connection side 20 inserted in the luminous element holder 1 corresponds to one of the connection sides 20 of the intermediate connector A1. The end face opposite therefrom, in the form of a terminating side 28, has a lead-through 25 for the electrical connection element 23, for example for the connection to an electrical power supply (not illustrated).

Figure 10:
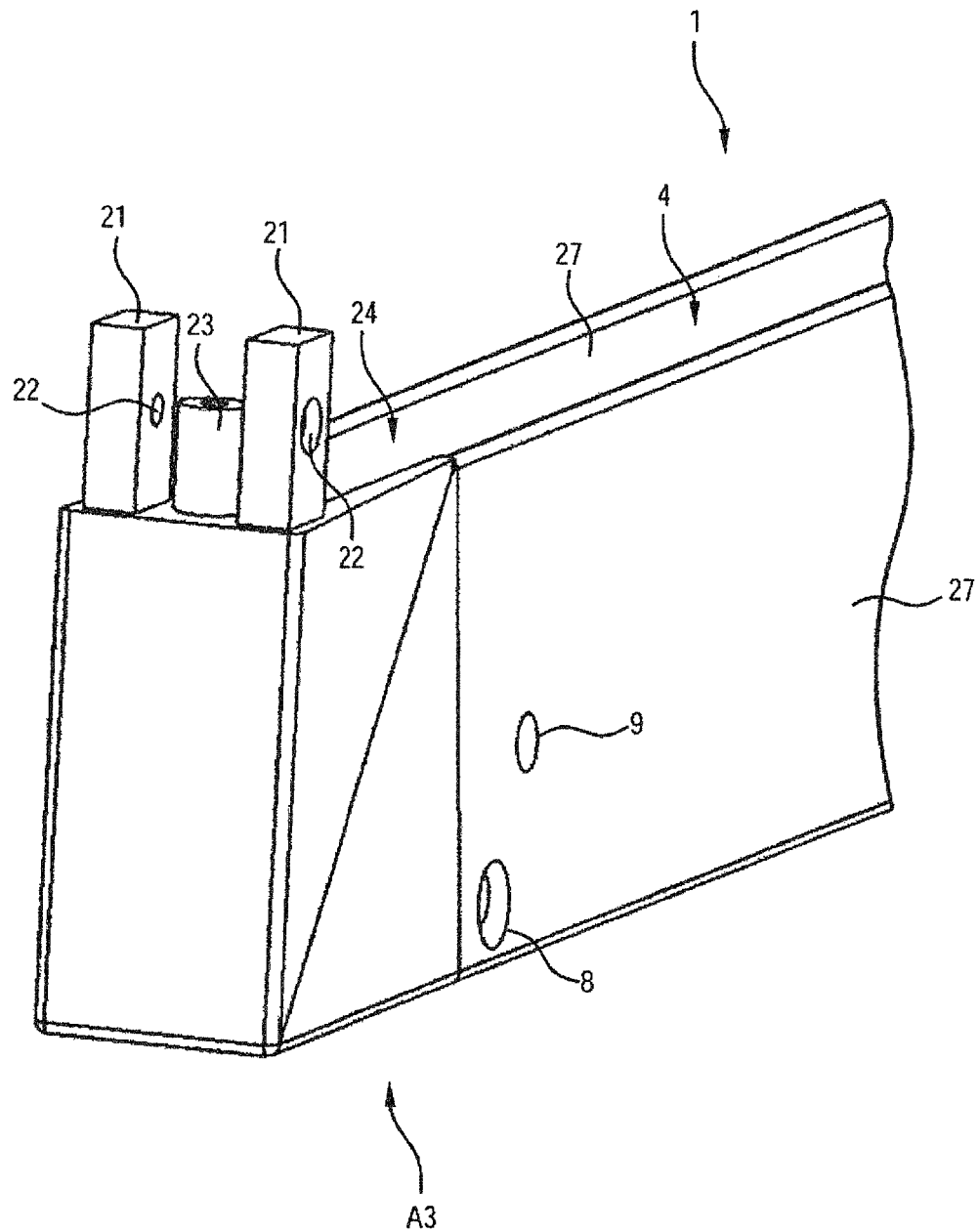
FIG. 10 shows a detail taken from the luminous element holder according to the disclosed embodiment in an oblique view, in a region of one of its longitudinal ends with the connection piece according to the disclosed embodiment as provided by the third embodiment.
Figure 11A:
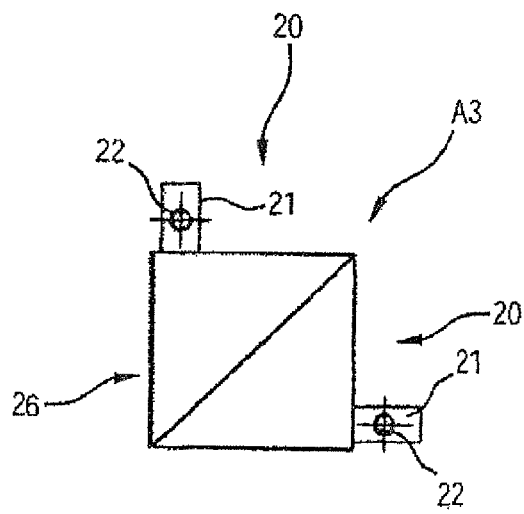
FIG. 11A shows the connection piece according to the disclosed embodiment as provided by the third embodiment in a side view.
Figure 11B:
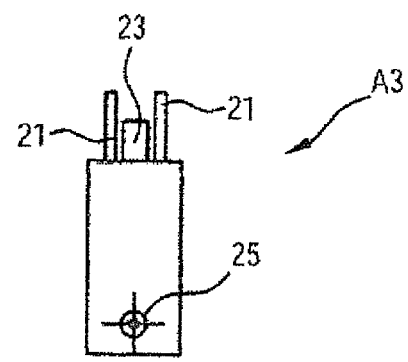
FIG. 11B shows the connection piece according to the disclosed embodiment as provided by the third embodiment in a view from outside toward an end face.
Figure 11C:
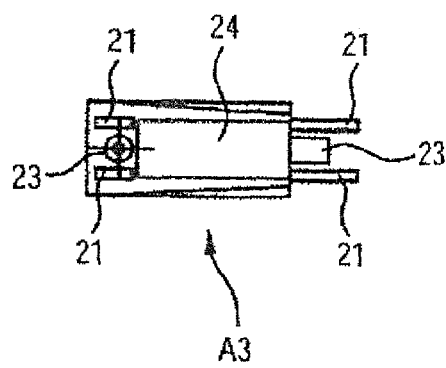
FIG. 11C shows the connection piece according to the disclosed embodiment as provided by the third embodiment in a plan view.
Figure 11D:
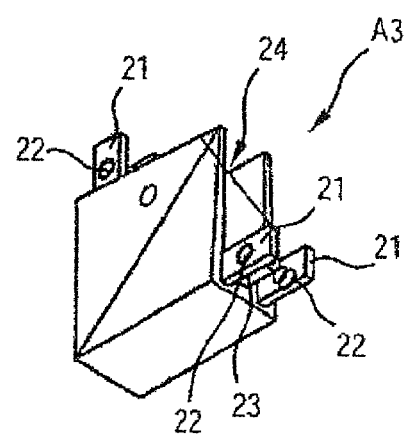
FIG. 11D shows the connection piece according to the disclosed embodiment as provided by the third embodiment in an oblique view.

FIG. 10 shows the corner connector A3 more precisely, in a state in which it has been inserted into a luminous element holder 1. FIGS. 11A to 11D show the corner connector A3 in various views. The two connection sides 20, one of which is adjacent the luminous element holder 1 or inserted therein, are identically designed and arranged facing away from one another and at right angles in relation to one another. This allows two luminous element holders 1 arranged at right angles in relation to one another to be mechanically and electrically connected to one another. For the insertion of the acrylic glass sheet 3, there is a rectangularly slot-like insertion chamber 24.

On an outer end face 26, which does not correspond to either of the two connection sides 20, the corner connector A3 has a lead-through 25 for the connection of an electrical power supply. The lead-through 25 allows an electrical connection to the electrical connection elements 23, for example for supplying them.

It goes without saying that the present invention is not restricted to the exemplary embodiment shown.

For instance, the body is not restricted to acrylic glass, but may for example consist of any suitable plastic, glass, ceramic, etc. The body also need not be in the form of a plate or sheet, but need only have a region that can be fitted into the insertion chamber and can be blocked by the at least one web, for example such a peripheral region.

While various embodiments have been particularly shown and described with reference to specific embodiments, it should be understood by those skilled in the art that various changes in form and detail may be made therein without departing from the spirit and scope of various embodiments as defined by the appended claims. The scope of various embodiments is thus indicated by the appended claims and all changes which came within the meaning and range of equivalency of the claims are therefore intended to be embraced.

LIST OF DESIGNATIONS 1 luminous element holder
2 LED light strip
3 acrylic glass sheet
4 interior chamber
5 web
6 insertion chamber
7 receiving chamber
8 through-hole
9 threaded hole
10 electrical connection element 11 longitudinal end
12 printed circuit board
13 light-emitting diode
14 upper side
15 rear side
16 opening
17 insertion chamber
18 base
19 upper edge
20 connection side
21 insertion projection
22 threaded hole
23 electrical connection element
24 insertion chamber
25 lead-through
26 end face
27 side wall
28 terminating side
A1 intermediate connector
A2 terminating piece
A3 corner connector

The invention claimed is:

1. A connection piece for fastening to a luminous element holder for fastening to at least one body, the luminous element holder comprising:
   a slotted interior chamber, wherein, by means of at least one web protruding laterally into the interior chamber, the interior chamber is divided into a slotted insertion chamber for receiving the at least one body, and
   a receiving chamber, openly adjoining the insertion chamber, for at least one luminous element, the luminous element comprising:
      a semiconductor light strip accommodated in the receiving chamber,
      a first connection element at each end of the semiconductor light strip configured to be contacted through the ends of the luminous element holder, the luminous element holder having a through-hole protruding through the luminous element holder to the receiving chamber, where the through-hole comprises two holes laterally through the walls of the receiving chamber, and where said holes are the same distance from the end of the longitudinal end of the luminous element holder and are of the same height
   wherein on at least one terminal connection side, the connection piece can be mounted onto an end of the luminous element holder, the connection piece has on each connection side two spaced-apart insertion projections, the insertion projections respectively having at least one through-hole such that when mounted the at least one through-hole of the insertion projections align with the through-hole of the luminous element holder, and the connection piece has between the insertion projections a second electrical connection element, the second connection element comprising:
      a first side having a connector in the form of a plug or a socket configured to detachably mate with the first connection element; and
      a second side configured as a lead-through connection.

2. The connection piece as claimed in claim 1, the connection piece having just one connection side and having the lead through connection on an end face opposite from the connection side.

3. The connection piece as claimed in claim 1, the connection piece being a connector, which has at least two connection sides.

4. The connection piece as claimed in claim 3, the connector being a linear intermediate connector, the connection sides of which are arranged facing away from one another and linearly in relation to one another.

5. The connection piece as claimed in claim 3, the connector being a corner connector, the connection sides of which are arranged facing away from one another and at right angles in relation to one another.

6. The connection piece as claimed in claim 1, where said receiving chamber is mirror-coated.

7. The connection piece as claimed in claim 1, where said through-hole is threaded.

* * * * *